US009026644B2

(12) United States Patent
Parker et al.

(10) Patent No.: US 9,026,644 B2
(45) Date of Patent: May 5, 2015

(54) ANOMALY DETECTION AND IDENTIFICATION USING TRAFFIC STEERING AND REAL-TIME ANALYTICS

(75) Inventors: Benjamin J. Parker, Vacaville, CA (US); Chris S. Neisinger, Danville, CA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 1091 days.

(21) Appl. No.: 13/045,048

(22) Filed: Mar. 10, 2011

(65) Prior Publication Data

US 2012/0233311 A1 Sep. 13, 2012

(51) Int. Cl.
*G06F 15/173* (2006.01)
*H04L 12/26* (2006.01)
*H04L 29/06* (2006.01)
*H04L 12/801* (2013.01)
*H04L 12/24* (2006.01)

(52) U.S. Cl.
CPC ............... *H04L 43/00* (2013.01); *H04L 43/16* (2013.01); *H04L 12/2602* (2013.01); *H04L 63/1425* (2013.01); *H04L 63/1408* (2013.01); *H04L 63/1416* (2013.01); *H04L 47/10* (2013.01); *H04L 41/142* (2013.01); *H04L 43/022* (2013.01)

(58) Field of Classification Search
CPC ... H04L 43/00; H04L 12/2602; H04L 43/022; H04L 43/16; H04L 47/10; H04L 63/1408; H04L 41/142; H04L 63/1416; H04L 63/1425
USPC .................................................. 709/224, 238
See application file for complete search history.

(56) References Cited

U.S. PATENT DOCUMENTS

| | | | |
|---|---|---|---|
| 6,457,051 B1 * | 9/2002 | Riddle et al. ................... | 709/224 |
| 6,748,431 B1 * | 6/2004 | Fleig et al. ..................... | 709/224 |
| 7,543,052 B1 * | 6/2009 | Cesa Klein .................... | 709/224 |
| 8,108,930 B2 * | 1/2012 | Hoefelmeyer et al. ......... | 726/23 |
| 8,612,844 B1 * | 12/2013 | Melton et al. .................. | 715/200 |
| 2003/0028634 A1 * | 2/2003 | Oshizawa ...................... | 709/224 |
| 2005/0163053 A1 * | 7/2005 | Paton et al. .................... | 370/241 |
| 2008/0134289 A1 * | 6/2008 | McConnell et al. .............. | 726/3 |
| 2008/0170501 A1 * | 7/2008 | Patel et al. ..................... | 370/235 |
| 2010/0153316 A1 * | 6/2010 | Duffield et al. ................. | 706/12 |
| 2011/0214183 A1 * | 9/2011 | Fudge ............................. | 726/23 |
| 2012/0117254 A1 * | 5/2012 | Ehrlich et al. ................. | 709/228 |
| 2012/0210421 A1 * | 8/2012 | Ormazabal et al. ............ | 726/22 |
| 2012/0278477 A1 * | 11/2012 | Terrell et al. .................. | 709/224 |
| 2013/0170386 A1 * | 7/2013 | Gonzalez De Langarica et al. ............................. | 370/252 |
| 2014/0007202 A1 * | 1/2014 | Zhao ................................ | 726/4 |
| 2014/0153396 A1 * | 6/2014 | Gopalan et al. ............... | 370/235 |

* cited by examiner

*Primary Examiner* — Oleg Survillo

(57) ABSTRACT

A system, associated with a service provider network, is configured to monitor traffic, that is traveling to or from the service provider network, to obtain traffic metrics that correspond to a collection of network layers, where the network layers; process the traffic metrics with respect to each of the network layers to identify an anomaly, associated with the traffic, that corresponds to at least one of the network layers; send a request for packets associated with the traffic based on the identification of the anomaly; receive copies of the packets associated with the traffic; analyze the copies of the packets to obtain information associated with the anomaly; and send a notification that indicates that the anomaly has been identified, where the notification includes the traffic metrics associated with the traffic or the information associated with the anomaly.

25 Claims, 6 Drawing Sheets

FIG. 4

ANOMALY DETECTION AND IDENTIFICATION USING TRAFFIC STEERING AND REAL-TIME ANALYTICS

BACKGROUND

Service provider networks transport network traffic associated with a variety of services, applications, and content. The network traffic may include voice, text, video and/or data. Service provider networks are sized and/or scaled in order to transport an increasing quantity of traffic that is sent by and/or received from more and more users and/or content providers. Additionally, the increase in the quantity of traffic corresponds to an expanding demand for various types of services, applications, and/or content.

Unfortunately, service provider networks are not always able to detect traffic conditions and/or anomalies associated with the increased quantity of traffic being transported over the networks. Additionally, techniques for identifying conditions and/or anomalies on a real-time basis often utilize large quantities of processing capacity, degrade network performance, and/or reduce network throughput. Traffic conditions and/or anomalies that are not detected and/or remedied may cause congestion, service disruption, and/or damage to occur within the service provider networks.

BRIEF DESCRIPTION OF THE DRAWINGS

FIG. 4 is a diagram of an example data structure that stores traffic metrics according to an implementation described herein;

DETAILED DESCRIPTION OF PREFERRED EMBODIMENTS

The following detailed description refers to the accompanying drawings. The same reference numbers in different drawings may identify the same or similar elements.

Systems and/or methods, described herein, may enable traffic (e.g., packets), associated with a service provider network, to be monitored in order to identify an anomaly, associated with the traffic, using traffic steering and/or real-time analytics techniques. The traffic steering and real-time analytics techniques may be used by a network device (e.g., an analytics and reporting (AR) server) to monitor the traffic, at one or more network layers (e.g., layers one through seven of the International Organization of Standardization's Open Systems Interconnect (OSI) model) of the service provider network. The AR server may, based on the monitoring, obtain information associated with the traffic (hereinafter referred to as "traffic metrics") at the one or more network layers. The AR server may identify an anomaly, associated with the traffic, based on the traffic metrics. The AR server may obtain packets associated with the anomaly and/or a flow to which the anomaly corresponds. The AR server may perform an analysis on the packets to identify information associated with the anomaly. The AR server may send a notification indicating that the anomaly has been detected. The notification may include the traffic metrics, information associated with the anomaly and/or context information associated with a user device that is affected by the anomaly.

The real-time monitoring may include inspecting packets in a stateful manner that does not hinder and/or reduce network throughput. The AR server may perform the stateful inspection by analyzing a portion of packets (e.g., headers, trailers, etc.), that does not include packet payloads, to obtain the traffic metrics. The AR server may perform statistical packet inspection (SPI) by analyzing whether particular traffic metrics conform to thresholds that are based on statistical norms associated with service provider network 150. The AR server may use the traffic metrics to identify changes, trends, and/or triggers that indicate that an anomaly exists. Analyzing the portion of the packets that does not include the packet payload (e.g., usually associated with deep packet inspection (DPI) techniques) may permit the AR server to detect the anomaly in a manner that does cause network and/or device throughput to decrease.

Figure 1:
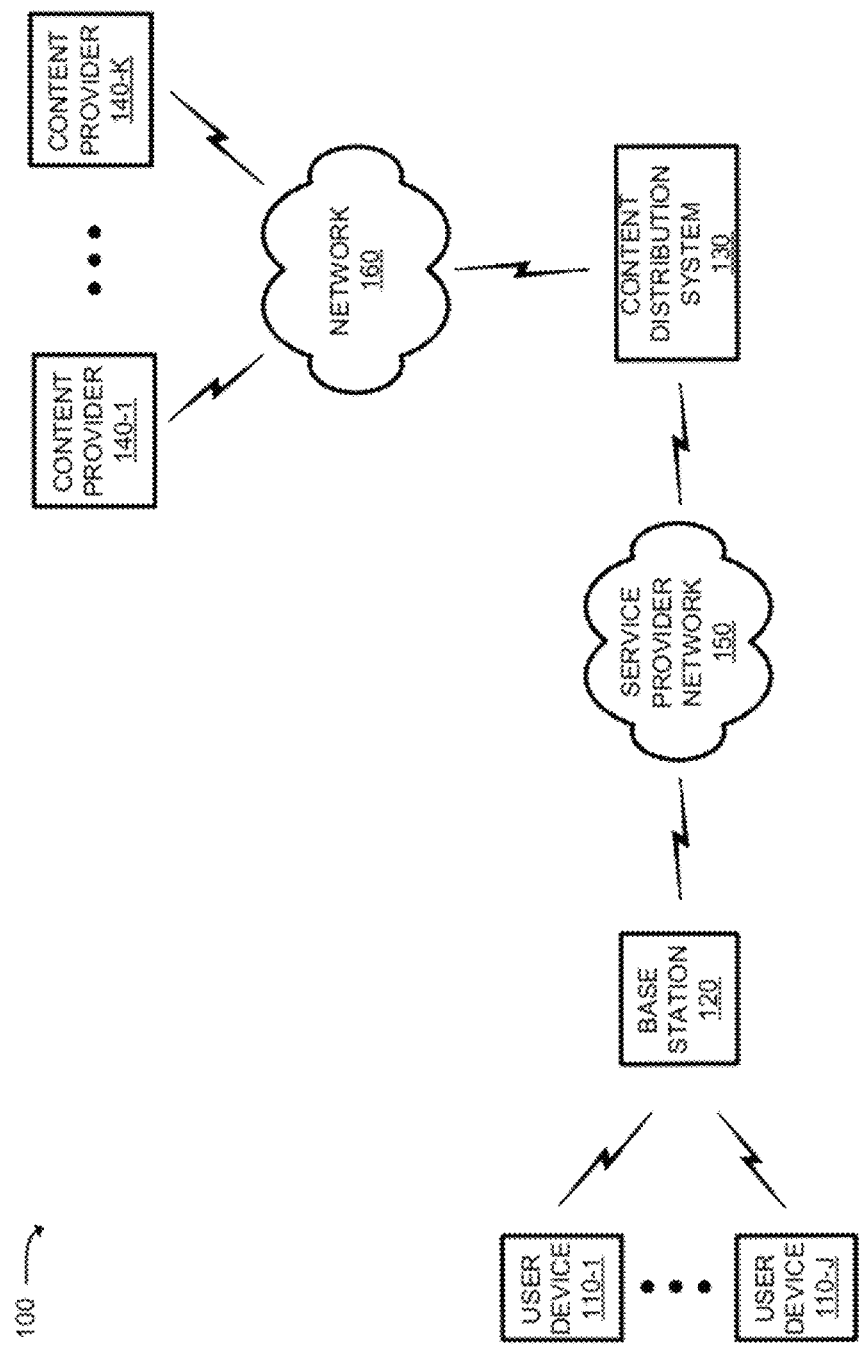
FIG. 1 is a diagram of an example environment in which systems and/or methods, described herein, may be implemented.

FIG. 1 is a diagram of an example environment 100 in which systems and/or methods described herein may be implemented. As shown in FIG. 1, environment 100 may include a group of user devices 110-1, ..., 110-J (where J≥1) (hereinafter referred to collectively as "user devices 110" and individually as a "user device 110"), a base station 120, a content distribution system (CDS) 130, a group of content providers 140-1, ..., 140-K (where K≥1) (hereinafter referred collectively as "content providers 140" and individually as "content provider 140"), a service provider network 150 and a network 160. The number of devices, systems, and/or networks, illustrated in FIG. 1, is provided for explanatory purposes only. In practice, there may be additional devices, systems, and/or networks; fewer devices, systems, and/or networks; different devices, systems, and/or networks; different devices, systems, and/or networks; or differently arranged devices, systems, and/or networks than illustrated in FIG. 1.

Also, in some implementations, one or more of the devices of environment 100 may perform one or more functions described as being performed by another one or more of the other devices of environment 100. Devices and/or systems of environment 100 may interconnect via wired connections, wireless connections, or a combination of wired and wireless connections.

User device 110 may include any computation or communication device, such as a wireless mobile communication device that is capable of communicating with base station 120. For example, user device 110 may include a radiotelephone, a personal communications system (PCS) terminal (e.g., that may combine a cellular radiotelephone with data processing and data communications capabilities), a personal digital assistant (PDA) (e.g., that can include a radiotelephone, a pager, Internet/intranet access, etc.), a laptop computer, a camera, a personal gaming system, or another type of mobile computation or communication device.

Base station 120 may include one or more devices that receive, process, and/or transmit traffic, such as voice, video, text, and/or other data, destined for and/or received from user device 110. One or more base stations 120 may be associated with a radio access network (RAN) that receives traffic from and/or sends traffic to service provider network 150. Base station 120 may send traffic to and/or receive traffic from user device 110 via an air interface and may include one or more cells via which signals are received from and/or transmitted to user device 110.

CDS 130 may include one or more devices that gather, process, search, store, and/or provide information in a manner similar to that described herein. CDS 130 may perform operations associated with content distribution within environment 100. For example, CDS 130 may perform caching operations by obtaining content from content provider 140 and/or temporarily storing the content in a memory associated with CDS 130. CDS 130 may process content in order to ensure that the content is sent to user device 110. CDS 130 may, for example, convert content into a format and/or protocol based on a type of user device 110. CDS 130 may send the content, to user device 110 in a manner that maximizes network throughput without inducing congestion, jitter, and/or other conditions.

CDS 130 may monitor packets associated with traffic flows being transported to and/or from service provider network 150. CDS 130 may, based on the monitoring, determine whether a traffic anomaly, associated with a traffic flow, is detected. CDS 130 may, for example, obtain traffic metrics from packets associated with the traffic and may use the traffic metrics to identify the anomaly. CDS 130 may obtain the traffic metrics at one or more of the seven OSI network layers, such as at the physical layer (e.g., layer 1), the data link layer (e.g., layer 2), the network layer (e.g., layer 3), the transport layer (e.g., layer 4), the session layer (e.g., layer 5), the presentation layer (e.g., layer 6), and/or the application layer (e.g., layer 7).

CDS 130 may process the traffic metrics to determine at which network layers anomalies are detected. CDS 130 may process the traffic metrics to identify which network device (e.g., within service provider network 150) and/or user device 110 is affected by the anomaly. CDS 130 may obtain context information associated with the affected user device 110 and/or network device (e.g., locations, device identifiers, Internet protocol (IP) addresses, etc.). CDS 130 may replicate packets associated with the flow to which the anomaly corresponds and may analyze the replicated packets to obtain information associated with the anomaly. CDS 130 may generate an anomaly report that includes the traffic metrics, the context information, and/or the information associated with the anomaly.

Content providers 140 may include any type or form of content providers. For example, content providers 140 may include free television broadcast providers (e.g., local broadcast providers, such as NBC, CBS, ABC, and/or Fox), for-pay television broadcast providers (e.g., TNT, ESPN, HBO, Cinemax, CNN, etc.), and/or Internet-based content providers (e.g., YouTube, Vimeo, Netflix, Hulu, Veoh, etc.) that stream content from web sites and/or permit content to be downloaded (e.g., via progressive download, etc.). Content providers 140 may produce media streams (e.g., television broadcasts). A media stream may refer to stream of content that includes video content (e.g., a video stream), audio content (e.g., an audio stream), and/or textual content (e.g., a textual stream).

Service provider network 150 may include one or more wired and/or wireless networks via which user devices 110 communicate and/or receive content. For example, service provider network 150 may include a cellular network, the Public Land Mobile Network (PLMN), a second generation (2G) network, a third generation (3G) network, a fourth generation (4G) network (e.g., a long term evolution (LTE) network), a fifth generation (5G) network, and/or another network. Additionally, or alternatively, service provider network 150 may include a wide area network (WAN), a metropolitan area network (MAN), an ad hoc network, an intranet, a fiber optic-based network (e.g., a fiber optic service network), and/or a combination of these or other types of networks.

Network 160 may include one or more wired and/or wireless networks. For example, network 160 may include a cellular network, the PLMN, a 2G network, a 3G network, a 4G network (e.g., an LTE network), a 5G network, and/or another network. Additionally, or alternatively, network 160 may include a WAN, a MAN, a telephone network (e.g., the Public Switched Telephone Network (PSTN)), an ad hoc network, an intranet, the Internet, a fiber optic-based network, and/or a combination of these or other types of networks.

Figure 2:
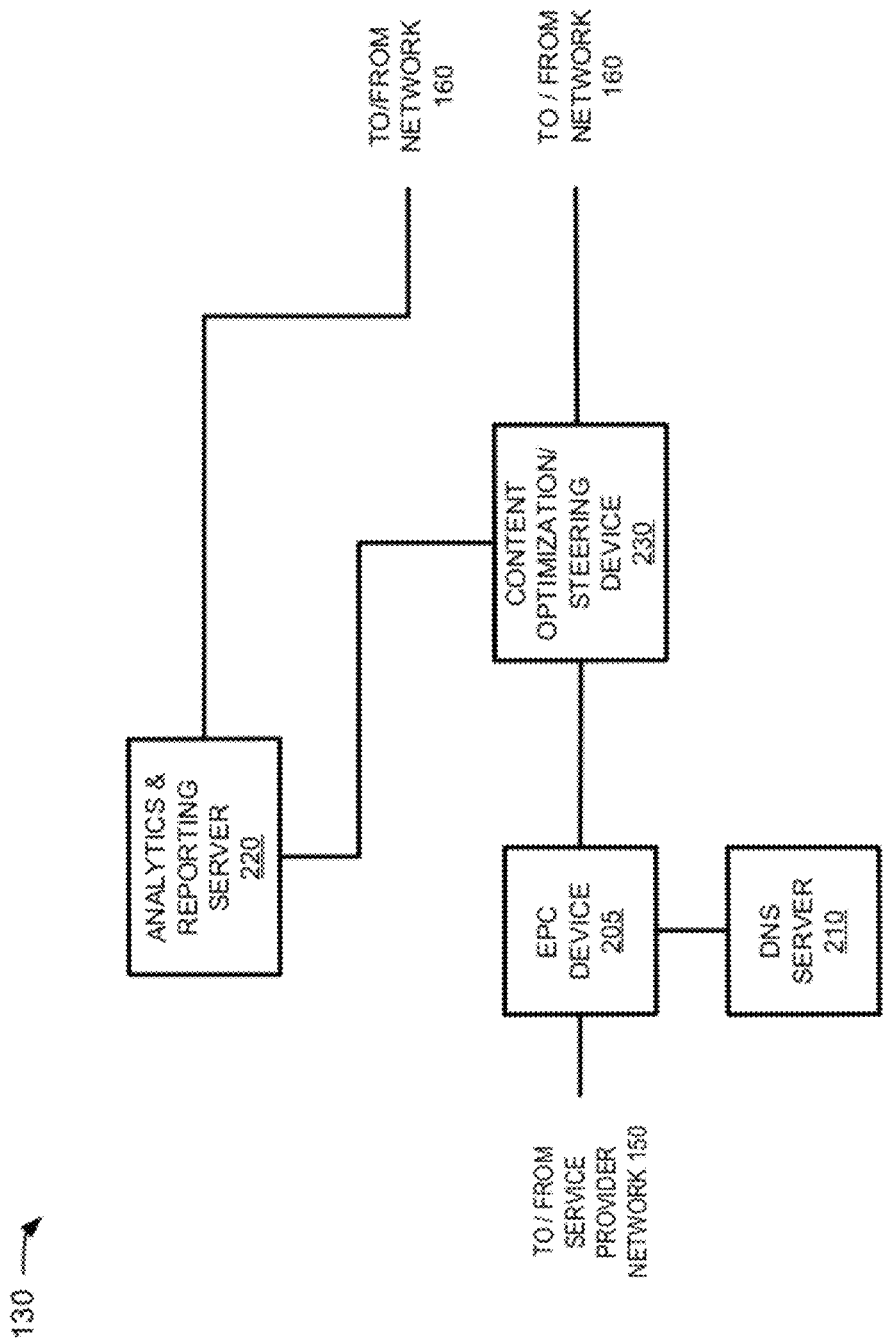
FIG. 2 is a diagram of example devices of a content distribution system of FIG. 1.

FIG. 2 is a diagram of example devices corresponding to CDS 130. CDS 130 may include an evolved packet core (EPC) device 205, a domain name system (DNS) server 210, an analytics and reporting (AR) server 220, and a content optimization (CO)/steering device 230 (hereinafter referred to as "CO steering device 230"). Although FIG. 2 shows example devices corresponding to CDS 130, in other implementations, CDS 130 may contain fewer devices, additional devices, different devices, or differently arranged devices than depicted in FIG. 2. Additionally, or alternatively, one or more devices of CDS 130 may perform one or more tasks described as being performed by one or more other devices of CDS 130.

EPC device 205 may include a network device that, receives, processes, switches, routes, and/or transmits packets associated with traffic being transported to and/or from service provider network 150. For example, EPC device 205 may take the form of a routing device, a switching device (e.g., an Ethernet switch, etc.), a multiplexing device, or a device that performs a combination of routing, switching, and/or multiplexing functions. In one example implementation, EPC device 205 may be a digital device. In another example implementation, EPC device 205 may be an optical device. In yet another example implementation, EPC device 205 may be a combination of a digital device and an optical device.

EPC device 205 may generally function to connect service provider network 150 to CO steering device 230 and/or network 160. For example, EPC device 205 may transfer traffic, received from user device 110 (e.g., via service provider network 150), to network 160 via CO steering device 230. In another example, EPC device 205 may receive, from network 160 and via CO steering device 230, traffic that is destined for user device 110, and EPC device 205 may send the traffic to user device 110 via service provider network 150. EPC device 205 may transfer DNS queries, received from user device 110 via service provider network 150, to DNS server 210 to obtain an IP address associated with content provider 140 from which content is to be retrieved. EPC device 205 may forward, to CO steering device 230, the obtained IP address in order to enable the content to be retrieved from content provider 140.

DNS server 210 may be a server device that manages, stores, and/or obtains one or more IP addresses for all or a portion of content providers 140 from which content can be obtained. DNS server 210 may receive, from user device 110 and via EPC 205, a request for an IP address associated with particular content (e.g., based on a domain name, etc.). DNS server 210 may, in one example, retrieve an IP address, associated with a particular content provider 140, that corresponds to the domain name. DNS server 210 may send the IP address to user device 110 in order to enable user device 110 to communicate with the particular content provider 140.

AR server 220 may include one or more server devices, or other types of computation or communication devices, that gather, process, search, store, and/or provide information in a manner similar to that described herein. In one example implementation, AR server 220 may monitor traffic being sent to and/or received from server provider network 150.

For example, AR server 220 may monitor packets associated with traffic flows that are being transported to and/or received from service provider network 150. AR server 220 may obtain traffic metrics, associated with the traffic flows, as a result of the monitoring.

AR server 220 may monitor the traffic flows, in real-time, at one or more of the OSI network layers. AR server 220 may, when monitoring the traffic flows, analyze packets associated with the traffic flows in a stateful manner (e.g., by analyzing the contents of packet headers, trailers, etc.). When analyzing the packets with respect to layer one, for example, AR server 220 may identify a quantity of bandwidth being used by user device 110. In another example, AR server may identify errors in layer three headers (e.g., IP version 4 (v4) headers, IP version 6 (v6) headers, etc.) and/or layer four headers (e.g., transmission control protocol (TCP) headers, user datagram protocol (UDP) headers, etc.). In yet another example, with respect to layer five processing, AR server 220 may identify information associated with calls placed by user device 110 and/or sent to user device 110, such as call termination rates, average call duration, etc. When processing the packets with respect to layer six, AR server 220 may determine whether a particular type of multipurpose Internet mail extension (MIME) (e.g., a particular MIME type) has been detected, etc. When processing the packets with respect to layer seven, AR server 220 may identify a quantity of web page not found errors (e.g., "404" errors), etc.

AR server 220 may determine that an anomaly, associated with a traffic flow, exists based on traffic metrics obtained as a result of monitoring the traffic flows. AR server 220 may, for example, determine that all or a portion of the traffic metrics do not conform to a threshold associated with one or more of the OSI thresholds. In an example implementation, AR server 220 may perform statistical packet inspection (SPI) by analyzing whether particular traffic metrics conform to thresholds that are based on statistical norms associated with service provider network 150.

AR server 220 may obtain context information, associated with user device 110, based on the determination that the anomaly has been detected. For example, AR server 220 may determine, from the traffic metrics, that user device 110 is affected by the anomaly. AR server 220 may obtain context information associated with user device 110 from service provider network 150. The context information may include an identifier associated with user device 110 (e.g., a mobile directory number (MDN), an IP address, etc.), information associated with an operating system being used by user device 110, a type of user device 110, etc. Additionally, or alternatively, AR server 220 may communicate with service provider network 150 to obtain location information associated with user device 110 (e.g., using a particular application programming interface (API) that enables the location information to be obtained). In another example, AR server 220 may retrieve, from service provider network 150, information associated with a usage history (e.g., previous web pages visited, calls made, etc.) that corresponds to user device 110.

AR server 220 may send a request for packets associated with the traffic flow to which the anomaly corresponds. For example, AR server 220 may generate an AR packet that identifies information associated with the flow (e.g., a source and/or destination IP address, a uniform resource locator (URL), a source and/or destination port, a MDN associated with user device 110, a type of user device 110, a quantity of packets to be copied, etc.). AR server 220 may send, to CO steering device 230, the AR packet requesting all or a portion of the packets associated with the flow. CO steering device 230 may receive the request and may replicate packets associated with the flow based on the information obtained from the AR packet. CO steering device 230 may send the replicated packets to AR server 220 in response to the request.

AR server 220 may receive the replicated packets and may analyze the packets to obtain information associated with the anomaly that may be stored within the replicated packets. The information associated with the anomaly may include, for example, an indication that malicious software (e.g., a virus, a worm, etc.) is included within the replicated packets. In another example, the information associated with the anomaly may include an indication that an incorrect protocol and/or standard is associated with the flow.

When analyzing the packets, AR server 220 may perform statistical analysis (e.g., based on SPI techniques) to determine whether particular traffic metrics conform to thresholds associated with statistical norms of network performance. In another example implementation, AR server 220 may perform a DPI operation that includes analyzing payloads associated with the replicated packets to obtain information associated with the anomaly.

AR server 220 may generate a notification associated with the anomaly that includes the replicated packets, information associated with the anomaly, the traffic metrics, the context information, and/or other information associated with the anomaly. AR server 220 may send the notification to a server device, that enables an operator, associated with service provider network 150, to remedy the anomaly.

CO steering device 230 may include one or more server devices, or other types of computation or communication devices, that gather, process, search, store, and/or provide information in a manner similar to that described herein. In one example implementation, CO steering device 230 may perform content optimization operations on content being served to user devices 110. For example, CO steering device 230 may process content, destined for user device 110, to maximize throughput and/or avoid congestion while being transported over service provider network 150.

In another example, CO steering device 230 may perform packet replication operations. For example, CO steering device 230 may receive, from AR server 220, a request for a copy of packets associated with a flow with which an anomaly has been detected. In one example, the request may include an AR packet which identifies information associated with the flow. CO steering device 230 may collect packets, associated with the flow identified by the request. CO steering device 230 may, for example, identify packets to be collected based on information obtained from the AR packet (e.g., a destination and/or source IP address, a URL, a destination and/or source port, a MDN, a MIME type, a device type, etc.). CO steering device 230 may perform a replication operation on the packets to generate a copy of the packets. CO steering device 230 may send the collected packets to the destination IP address and may send (e.g., "steer") the replicated packets to AR server 220 in response to the request.

Figure 3:
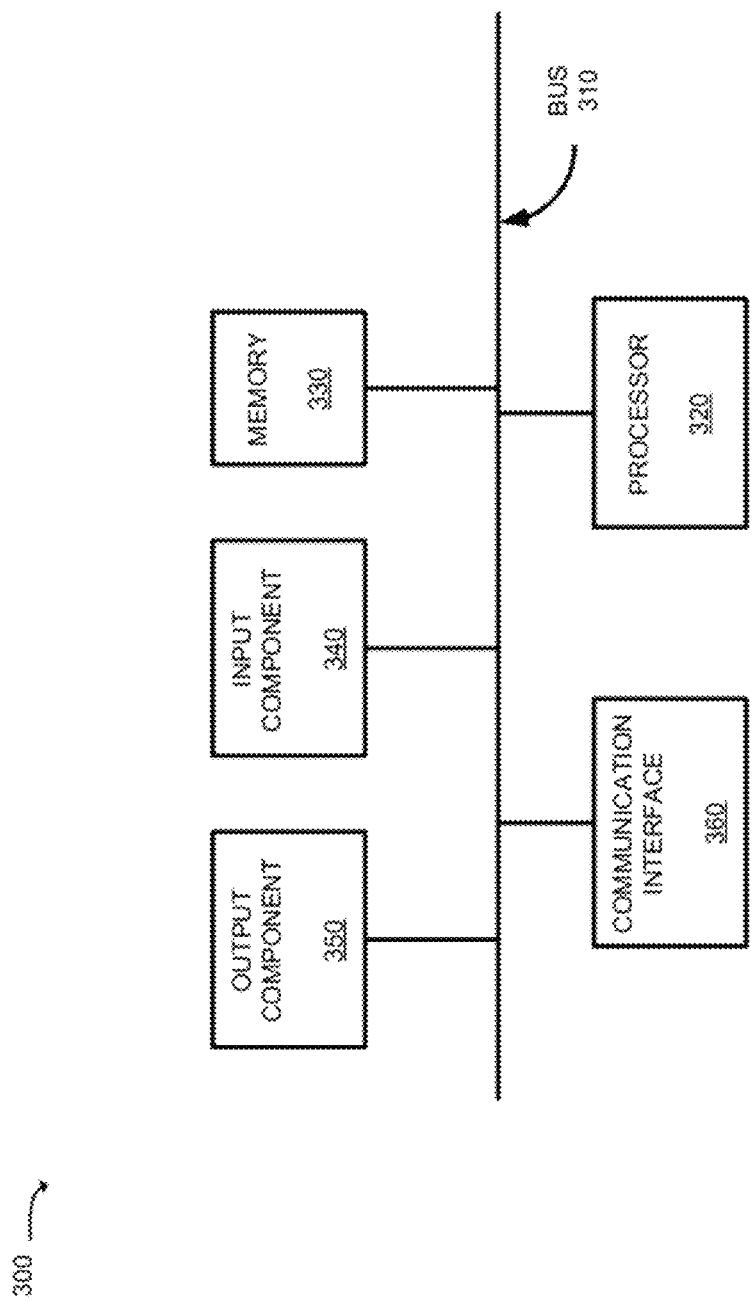
FIG. 3 is a diagram of example components of one or more of the devices of FIGS. 1 and 2.

FIG. 3 is a diagram of example components of a device 300 that may correspond to user device 110, EPC device 205, DNS server 210, AR server 220, and/or CO steering device 230. Alternatively, each of user device 110, EPC device 205, DNS server 210, AR server 220, and/or CO steering device 230 may include one or more of device 300. Device 300 may include a bus 310, a processor 320, a memory 330, an input component 340, an output component 350, and a communication interface 360. Although FIG. 3 shows example components of device 300, in other implementations, device 300 may contain fewer components, additional components, different components, or differently arranged components than depicted in FIG. 3. For example, device 300 may include one or more switch fabrics instead of, or in addition to, bus 310. Additionally, or alternatively, one or more components of device 300 may perform one or more tasks described as being performed by one or more other components of device 300.

Bus 310 may include a path that permits communication among the components of device 300. Processor 320 may include a processor, microprocessor, or processing logic that may interpret and execute instructions. Memory 330 may include any type of dynamic storage device that may store information and instructions, for execution by processor 320, and/or any type of non-volatile storage device that may store information for use by processor 320.

Input component 340 may include a mechanism that permits a user to input information to device 300, such as a keyboard, a keypad, a button, a switch, etc. Output component 350 may include a mechanism that outputs information to the user, such as a display, a speaker, one or more light emitting diodes (LEDs), etc. Communication interface 360 may include any transceiver-like mechanism that enables device 300 to communicate with other devices and/or systems via wireless communications (e.g., radio frequency, infrared, and/or visual optics, etc.), wired communications (e.g., conductive wire, twisted pair cable, coaxial cable, transmission line, fiber optic cable, and/or waveguide, etc.), or a combination of wireless and wired communications. For example, communication interface 360 may include mechanisms for communicating with another device or system via a network, such as service provider network 150 and/or network 160. In one alternative implementation, communication interface 360 may be a logical component that includes input and output ports, input and output systems, and/or other input and output components that facilitate the transmission of data to other devices.

As will be described in detail below, device 300 may perform certain operations relating anomaly detection and identification. Device 300 may perform these operations in response to processor 320 executing software instructions contained in a computer-readable medium, such as memory 330. A computer-readable medium may be defined as a non-transitory memory device. A memory device may include space within a single physical memory device or spread across multiple physical memory devices. The software instructions may be read into memory 330 from another computer-readable medium or from another device. The software instructions contained in memory 330 may cause processor 320 to perform processes described herein. Alternatively, hardwired circuitry may be used in place of or in combination with software instructions to implement processes described herein. Thus, implementations described herein are not limited to any specific combination of hardware circuitry and software.

Figure 4:
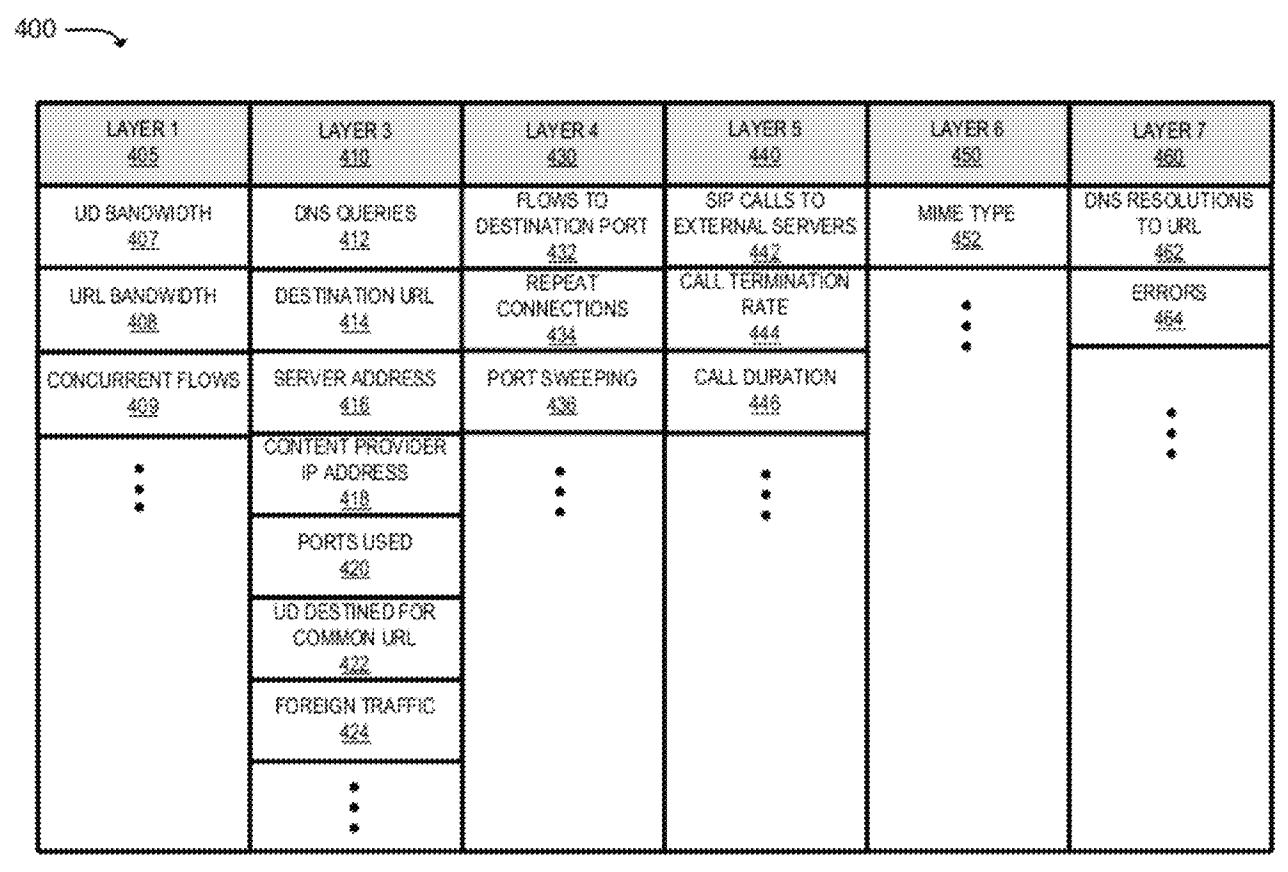

FIG. 4 is a diagram of an example data structure 400 that stores traffic metrics (hereinafter referred to as "metrics data structure 400") according to an implementation described herein. AR server 220 may monitor traffic flows being transported to and/or from service provider network 150 and may collect traffic metrics, associated with one or more flows, for storage in metrics data structure 400. Metrics data structure 400 may include a collection of fields, such as a layer 1 field 405, a layer 3 field 410, a layer 4 field 430, a layer 5 field 440, a layer 6 field 450, and a layer 7 field 460. Metrics data structure 400, of FIG. 4, includes fields 405-460 for explanatory purposes. In practice, metrics data structure 400 may include additional fields, fewer fields, different fields, and/or differently arranged fields than are described with respect to metrics data structure 400.

Layer 1 field 405 may store traffic metrics associated with layer one of the OSI model. Layer 1 field 405 may include a user device (UD) bandwidth entry 407, a uniform resource locator (URL) bandwidth entry 408, and a concurrent flow entry 409. Layer 1 field 405 includes entries 407-409 for explanatory purposes. In practice, layer 1 field 405 may include additional entries, fewer entries, different entries, and/or differently arranged entries than are described with respect to layer 1 field 405.

UD bandwidth entry 407 may store information associated with a quantity of bandwidth associated with flows originating from user device 110 and/or being served to user device 110 over a period of time during which AR server 220 is monitoring the traffic. URL bandwidth entry 408 may store information associated with a quantity of bandwidth of a URL, that corresponds to a particular content provider 140. The quantity of bandwidth may, for example, be based on flows from one or more user devices 110 that are communicating with the particular content provider during the period of time. Concurrent flow entry 409 may store information associated with a quantity of concurrent flows to and/or from service provider network 150 during the period of time.

AR server 220 may, for example, detect an anomaly associated with layer one traffic metrics, when the quantity of bandwidth, stored in UD bandwidth entry 407 is greater than a threshold associated with a maximum quantity of bandwidth used by user device 110. In another example, AR server 220 may determine that an anomaly exists when the quantity of bandwidth, stored in URL bandwidth entry 408, is greater than a threshold associated with a maximum quantity of bandwidth used for a URL. In yet another example, AR server 220 may determine that an anomaly exists when the quantity of concurrent flows, as indicated by concurrent flow entry 409, is greater than a threshold associated with a maximum quantity of concurrent flows.

Layer 3 field 410 may store traffic metrics associated with layer three of the OSI model. Layer 3 field 410 may include a domain name service (DNS) queries entry 412, a destination uniform resource locator (URL) entry 414, a server address entry 416, a content provider IP address entry 418, a ports entry 420, a user device (UD) destined to common URL entry 422, and a foreign traffic entry 424. Layer 3 field 410 includes entries 412-424 for explanatory purposes. In practice, layer 3 field 410 may include additional entries, fewer entries, different entries, and/or differently arranged entries than are described with respect to layer 3 field 410.

DNS queries entry 412 may store information associated with a DNS queries rate based on a quantity of DNS queries over the period of time during which AR server 220 is monitoring the traffic associated with service provider network 150. Destination URL entry 414 may store a destination URL associated with a flow. Server address entry 416 may store a server URL and/or IP address that has not previously been detected by AR server 220. For example, AR server 220 may compare a server URL and/or IP address, obtained from the traffic, to a list of URLs and/or IP addresses stored in a memory associated with AR server 220. AR server 220 may store the server URL and/or IP address in server URL entry 416 based on a determination that the server URL and/or IP address does not match a stored URL and/or IP address. Content provider IP address entry 418 may store an IP address associated with content provider 140 with which a flow is associated. For example, AR server 220 may store an IP address obtained from a hypertext transfer protocol (HTTP) message (e.g., a HTTP get message) to retrieve content from content provider 140.

Ports entry 420 may store information associated with a quantity of ports being used by user device 110 over a period of time during which AR server 220 is monitoring traffic. UD destined for common URL entry 422 may store information associated with a quantity of user devices 110, associated with service provider network 150, that are communicating with the same URL and/or port. Foreign traffic entry 424 may store information associated with a quantity of traffic flows to and/or from a network associated with a foreign country.

AR server 220 may, for example, detect an anomaly associated with layer three traffic metrics, when a DNS query rate (e.g., stored in DNS queries entry 412) is greater than a threshold associated with a maximum DNS query rate permitted by service provider network 150. In another example, AR server 220 may determine that an anomaly exists when a server URL and/or IP address, which has not before been detected, is stored in server address entry 416. In yet another example, AR server 220 may determine that an anomaly exists when a quantity of ports being used by user device 110, as indicated by ports used entry 420, is greater than a threshold associated with a maximum quantity of ports permitted to be used by user device 110. In still another example, AR server may determine that an anomaly exists when a quantity of user devices 110 that are communicating with the same URL, as indicated by UD destined for common URL entry 422, is greater than a threshold. The threshold may be associated with a maximum quantity of user devices 110 permitted to communicate with a URL at a point in time. In further example, AR server 220 may determine that an anomaly exists when a quantity of flows that are being sent to and/or received from a network associated with a foreign country, as indicated by foreign traffic entry 424, is greater than a threshold associated with a maximum quantity of flows associated with a foreign country.

Layer 4 field 430 may store traffic metrics associated with layer four of the OSI model. Layer 4 field 430 may include a flows to destination port entry 432, a repeat connections entry 434, and a port sweeping entry 436. Layer 4 field 440 includes entries 432-436 for explanatory purposes. In practice, layer 4 field 430 may include additional entries, fewer entries, different entries, and/or differently arranged entries than are described with respect to layer 4 field 430.

Flows to destination port entry 432 may store information associated with a quantity of concurrent flows, from service provider network 150, that are destined for a particular TCP port and/or UDP port. Repeat connections entry 434 may store information associated with quantity of times user device 110 attempts to reconnect to the same TCP and/or UDP port. Port sweeping entry 436 may store information that indicates that user device 110 is sweeping UDP and/or TCP ports. For example, AR server 220 may determine that user device 110 is repeatedly attempting to connect to a quantity of ports within period of time during which AR server 220 is monitoring the traffic.

AR server 220 may, for example, detect an anomaly associated with layer four traffic metrics, when a quantity of concurrent flows that are destined for a particular TCP and/or UDP port, as indicated by flows to destination port entry 432, are greater than a threshold. The threshold may correspond to a maximum quantity of concurrent flows, destined for a TCP and/or UDP port, that are permitted by service provider network 150. In another example, AR server 220 may determine that an anomaly exists when a quantity of times user device 110 attempts to reconnect to a particular TCP and/or UDP port (e.g., as indicated by repeat connections entry 434) is greater than a threshold associated with a maximum quantity of repeat connections permitted by service provider network 150. In yet another example, AR server 220 may determine that an anomaly exists when an indication that user device 110 is port sweeping, is stored in port sweeping entry 436.

Layer 5 field 440 may store traffic metrics associated with layer five of the OSI model. Layer 5 field 440 may include a session initiation protocol (SIP) calls to external server entry 442, a call termination rate entry 444, and a call duration entry 446. Layer 5 field 440 includes entries 442-446 for explanatory purposes. In practice, layer 5 field 440 may include additional entries, fewer entries, different entries, and/or differently arranged entries than are described with respect to layer 5 field 440.

SIP calls to external server entry 442 may store information associated with a quantity of calls to SIP servers that are not associated with service provider network 150. Call termination rate entry 444 may store information associated with a call termination rate associated with service provider network 150. For example, AR server 220 may identify the call termination rate based on a quantity of call terminations over a period of time during which AR server 220 is monitoring traffic. Call duration entry 446 may store information associated with a time period of calls (e.g., an average call duration, etc.) originating from service provider network 150 and/or being sent to user devices 110 via service provider network 150.

AR server 220 may, for example, detect an anomaly associated with layer five traffic metrics, when a quantity of calls to an external SIP server, as indicated by entry 442, is greater than a threshold that corresponds to a maximum quantity of calls to the external SIP server that is permitted by service provider network 150. In another example, AR server 220 may determine that an anomaly exists when a call termination rate, as indicated by call termination rate entry 444, is greater than a threshold that corresponds to a maximum call termination rate permitted by service provider network 150. In yet another example, AR server 220 may determine that an anomaly exists when a difference between an average call duration, as indicated by average call duration entry 446, and an average call duration, associated with service provider network 150, is greater than a threshold.

Layer 6 field 450 may store traffic metrics associated with layer six of the OSI model. Layer 6 field 460 may include a MIME type entry 452. Layer 6 field 450 includes entry 452 for explanatory purposes. In practice, layer 6 field 450 may include additional entries, different entries, and/or differently arranged entries than are described with respect to layer 6 field 450. MIME type entry 452 may store information associated with a MIME type that has not before been detected by AR server 220. AR server 220 may, for example, detect an anomaly associated with layer six traffic metrics, when a MIME type, not before detected by AR server 220, is stored in MIME type entry 452.

Layer 7 field 460 may store traffic metrics associated with layer seven of the OSI model. Layer 7 field 460 may include a DNS resolutions to URL entry 462 and an errors entry 464. Layer 7 field 460 includes entries 462 and 464 for explanatory purposes. In practice, layer 7 field 460 may include additional entries, fewer entries, different entries, and/or differently arranged entries than are described with respect to layer 7 field 460.

DNS resolutions to URL entry 462 may store information associated with a quantity of DNS query results that are associated with a particular URL. Errors entry 464 may store information associated with a quantity of "404" errors (e.g., web page not found) received when user devices 110, associated with service provider network 150, attempt to retrieve content from content providers 140.

AR server 220 may, for example, detect an anomaly associated with layer seven traffic metrics, when a quantity of DNS query results, associated with a particular URL (as indicated by entry 462), are greater than a threshold. The threshold may be associated with a maximum quantity of DNS query results, associated with a particular URL, that is permitted by service provider network 150. In another example, AR server 220 may detect an anomaly when the quantity of 404 errors, received by user devices 110 (as indicated by entry 464), is greater than a threshold associated with a maximum quantity of 404 errors permitted by service provider network 150.

Figure 5:
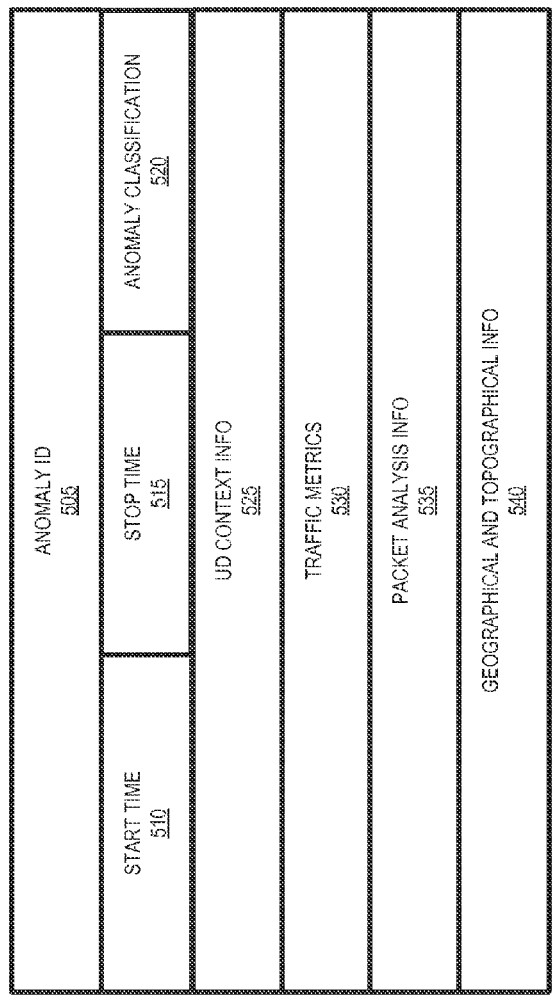
FIG. 5 is a diagram of an example data structure that stores information associated with a traffic anomaly according to an implementation described herein.

FIG. 5 is a diagram of an example data structure 500 that stores information associated with a traffic anomaly (hereinafter referred to as an "anomaly data structure 500") according to an implementation described herein. Anomaly data structure 500 may include a collection of fields, such as an anomaly identifier (ID) field 505, a start time field 510, a stop time field 515, an anomaly classification field 520, a user device (UD) context information (info) field 525, a traffic metrics field 530, a packet analysis information (info) field 535 and a geographical/topographical information (info) field 540 (hereinafter referred to as "geo field 540"). Anomaly data structure 500 includes fields 505-540 for explanatory purposes. In practice, anomaly data structure 500 may include additional fields, fewer fields, different fields, and/or differently arranged fields than are described with respect to anomaly data structure 500.

Anomaly ID field 505 may store a unique identifier associated with an anomaly that has been detected by AR server 220. The unique identifier may be used, by AR server 220 and/or a network management server to track and/or manage the anomaly. Start time field 510 may store a time at which the anomaly was detected by AR server 220 when monitoring the traffic to and/or from service provider network 150. Stop time field 515 may store another time when the anomaly is no longer detected by AR server 220.

Anomaly classification field 520 may store information associated with a class of the anomaly. For example, AR server 220 may store information associated with a class of the anomaly that corresponds to one or more OSI layers in which the anomaly was detected. In another example, AR server 220 may store information associated with a class of the anomaly based on a type of anomaly (e.g., a protocol error, a potential electronic attack, malicious software, an unknown user device 110, an unknown content provider 140, etc.). In yet another example, AR server 220 may store information associated with a class of anomaly that corresponds to a severity of the anomaly and/or an urgency by which to remedy the anomaly.

UD context info field 525 may store context information associated with user device 110 that has been affected by the anomaly. The context information may include, for example, information associated with user device 110 (e.g., a MDN, an IP address, a port identifier, etc.), information associated with a type of user device 110, information associated with an operating system hosted by user device 110, a location associated with user device 110 (e.g., latitude, longitude, a geographical area in which user device 110 is located, a zip code, an address, etc.), and/or information associated with a user of user device 110 (e.g., a username, password, personal identification number (PIN), etc.). The context information may also, or alternatively, include information associated with prior usage history associated with user device 110, such as a quantity of previous web pages accessed, calls placed and/or received, and/or URLs used by user device 110. Traffic metrics field 530 may include all or a portion of the traffic metrics obtained, by AR server 220, as a result of the monitoring (e.g., as shown in metrics data structure 400 of FIG. 4).

Packet analysis info field 535 may store information obtained by AR server 220 as a result of a packet analysis operation performed on packets associated with a flow that corresponds to the anomaly. In one example, the packets on which the packet analysis was performed may be replicated from packets, associated with the flow that corresponds to the anomaly. Packet analysis field 535 may store information generated as a result of statistical analysis (e.g., based on SPI techniques) of the packets relative to packets associated with other anomalies within service provider network 150. For example, the packet analysis information, stored within packet analysis info field 535, may include a quantity of flows (e.g., that is statistically greater than a threshold) associated with the anomaly and/or other anomalies detected within service provider network 150. In another example, the packet analysis information may include information associated with other flows and/or other anomaly IDs, detected by AR server 220 within service provider network 150, that correlate to the classification of the anomaly (e.g., as identified by anomaly classification field 520).

The packet analysis information may include information associated with a quantity of bandwidth associated with the anomaly and/or the other anomalies that is statistically greater than a threshold. The packet analysis information may include information associated with network layer three header values (e.g., such as an IPv4 header, an IPv6 header, etc.) and/or network layer four header values (e.g., a TCP header, a UDP header, etc.). AR server 220 may identify and/or highlight errors detected within the information associated with the layer three header and/or layer four header. The packet analysis information may include sequence identifiers associated with the packets and AR server 220 may identify missing packets and/or mis-ordered packets based on missing sequence identifiers and/or mis-ordered sequence identifiers, respectively.

Geo field 540 may store geographical information and/or network topographical information associated with the anomaly and/or other anomalies. The geographical information may include information associated with a geographical area within which user devices 110 and/or network devices (e.g., within service provider network 150) that are affected by the anomaly are located. The network topographical information may include information associated with a topology of service provider network 150. The topology of service provider network 150 may identify devices and/or network paths within service provider network 150 and/or may highlight particular devices that may be affected by the anomaly.

Figure 6:
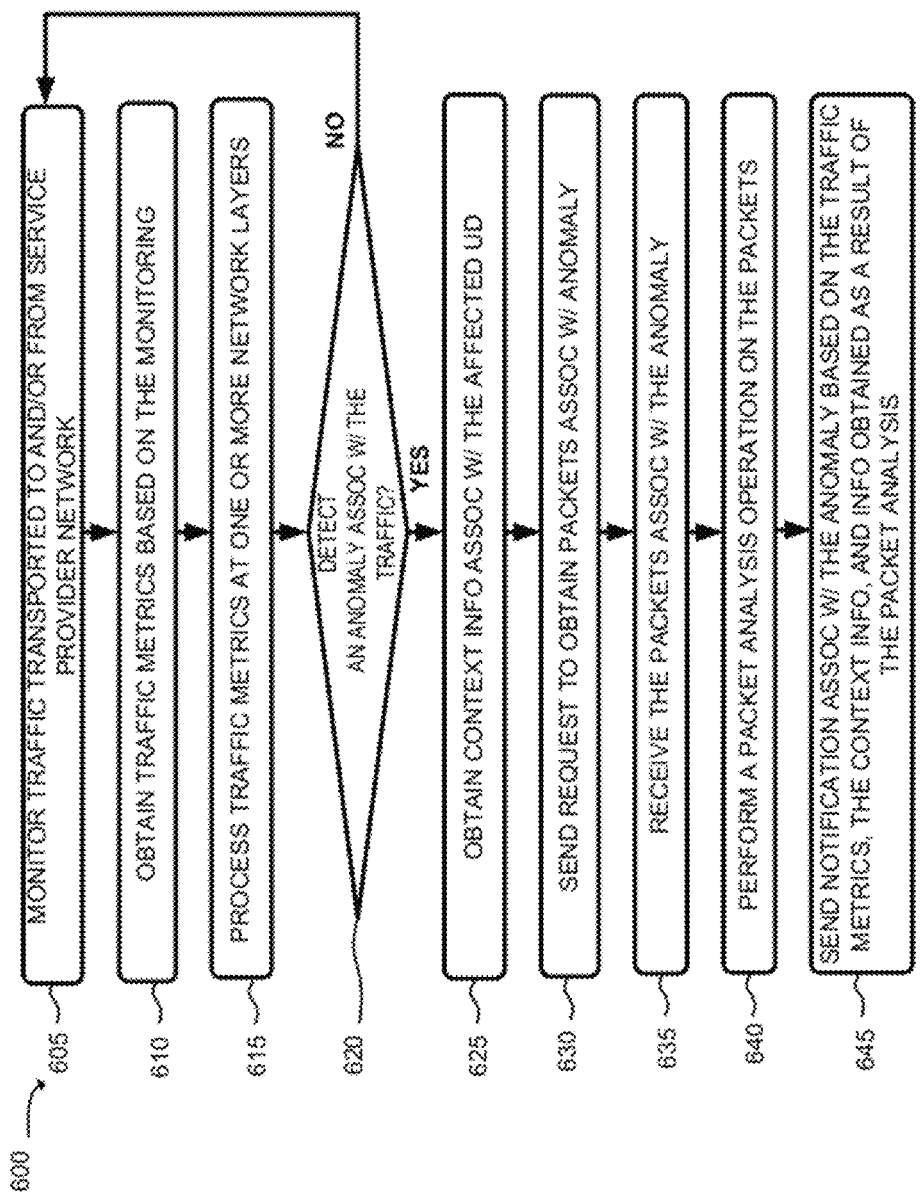
FIG. 6 is a flow chart of an example process for detecting and/or identifying a traffic anomaly according to an implementation described herein.

FIG. 6 is a flow chart of an example process for detecting and/or identifying a traffic anomaly according to an implementation described herein. In one example implementation, process 600 may be performed by AR server 220 In another example implementation, some or all of process 600 may be performed by a device or collection of devices separate from, or in combination with, AR server 220.

As shown in FIG. 6, process 600 may include monitoring traffic being transported to and/or from a service provider network (block 605). For example, AR server 220 may monitor traffic being transported to and/or from service provider network 150. AR server 220 may, for example, monitor the traffic with respect to one or more network layers of the OSI model (e.g., layers one through seven). AR server 220 may, in another example, monitor each packet, associated with the traffic, in a stateful manner (e.g., based on packet content that is not stored in packet payloads) and/or another technique that does not include DPI of packet payloads.

As also shown in FIG. 6, process 600 may include obtaining traffic metrics based on the traffic monitoring (block 610). For example, AR server 220 may obtain traffic metrics, associated with the traffic that is being transported to and/or from service provider network 150, as a result of monitoring the traffic. AR server 220 may obtain traffic metrics with respect to network layer one in a manner similar to that described above (e.g., layer 1 field 405 of FIG. 4). The layer one traffic metrics may be include information associated with a quantity of bandwidth used by user device 110 and/or another quantity of bandwidth that corresponds to communications associated with an IP address and/or URL. Additionally, or alternatively, the layer one traffic metrics may include a quantity of concurrent flows associated with the traffic.

AR server 220 may obtain traffic metrics with respect to network layer three in a manner similar to that described above (e.g., layer 3 field 410 of FIG. 4). The layer three traffic metrics may include information associated with a quantity of DNS queries being processed by service provider network 150 and/or DNS server 210. The layer three traffic metrics may include a destination URL associated with the traffic and/or an IP address used in requests to obtain content (e.g., an HTTP get message) from content provider 140. The layer three traffic metrics may include a server URL and/or a server IP address that has not yet been detected by AR server 220. The layer three traffic metrics may include information associated with a quantity of ports being used by user device 110 at a point in time and/or over a period of time. The layer three traffic metrics may include information associated with a quantity of user devices 110 that are communicating with a particular URL and/or a network associated with a foreign country (e.g., a country other than a country in which service provider network 150 is located).

AR server 220 may obtain traffic metrics with respect to network layer four in a manner similar to that described above (e.g., layer 1 field 405 of FIG. 4). The layer four traffic metrics may include information associated with a quantity of concurrent flows that are destined to a particular port (e.g., a TCP port, a UDP port, etc.) and/or information associated a quantity of repeat connections, by user device 110, to a particular port. The layer four traffic metrics may include an indication that user device 110 is sweeping ports (e.g., repeatedly attempting to communicate via multiple TCP ports, UDP ports, and/or other ports).

AR server 220 may obtain traffic metrics with respect to network layer five in a manner similar to that described above (e.g., layer 5 field 440 of FIG. 4). The layer five traffic metrics may include information associated with a quantity of SIP calls to an external server (e.g., a server that is not associated with service provider network 150). The layer five traffic metrics may include information associated with a call termination rate and/or a call duration (e.g., an average call duration, etc.).

AR server 220 may obtain traffic metrics with respect to network layer six in a manner similar to that described above (e.g., layer 6 field 450 of FIG. 4). The layer six traffic metrics may include information associated with a MIME type that has not yet been detected by AR server 220.

AR server 220 may obtain traffic metrics with respect to network layer seven in a manner similar to that described above (e.g., layer 7 field 460 of FIG. 4). The layer seven traffic metrics may include information associated with a quantity of DNS queries to a particular URL and/or a quantity of 404 errors associated with the traffic.

As further shown in FIG. 6, process 600 may include processing the traffic metrics at one or more network layers (block 615). For example, AR server 220 may process the traffic metrics at each of the one or more network layers for which traffic metrics were obtained to determine whether an anomaly exists with respect to the traffic. In one example implementation, AR server 220 may perform statistical analysis (e.g., based on SPI techniques) on the traffic metrics to determine whether any of the traffic metrics do not conform to threshold corresponding to statistical norms associated with service provider network 150. AR server 220 may, for example, compare one or more traffic metrics, associated with layer one traffic metrics, with a respective different threshold that corresponds to each of the one or more layer one traffic metrics. In one example, AR server 220 may compare a quantity of bandwidth, associated with traffic originating from user device 110, with a threshold associated with a maximum quantity of bandwidth for user device 110. AR server 220 may, in another example, compare another layer one traffic metric (e.g., quantity of concurrent flows, quantity of bandwidth associated with a particular URL, etc.) with another threshold to determine whether a layer one anomaly is detected with respect to the other layer one traffic metric.

AR server 220 may, for example, compare one or more traffic metrics, associated with layer three traffic metrics, with a respective different threshold that corresponds to each of the one or more layer three traffic metrics. In one example, AR server 220 may compare a quantity of DNS queries being processed over a period of time with a threshold associated with a maximum quantity of DNS queries permitted to be processed over the period of time. AR server 220 may compare another layer three traffic metric (e.g., a quantity of ports being used by user device 110 over a time period, a quantity of user devices 110 communicating with a particular URL and/or port, a quantity of user devices 110 that are communicating with a network associated with a foreign country, etc.) with another threshold to determine whether a layer three anomaly is detected with respect to the other layer three traffic metric. In another example, AR server 220 may determine whether an layer three anomaly is detected based on whether a destination URL, a server IP address, and/or a server URL, which have not been detected at a previous point in time, have been detected by AR server 220.

AR server 220 may, for example, compare one or more traffic metrics, associated with layer four traffic metrics, with a respective different threshold that corresponds to each of the one or more layer four traffic metrics. In one example, AR server 220 may compare a quantity of concurrent flows destined for a particular port (e.g., a TCP port, UDP port, etc.) with a threshold associated with a maximum quantity of concurrent flows destined for a port permitted by service provider network 150. AR server 220 may compare other layer four traffic metrics (e.g., a quantity of repeat connection attempts to a particular port, etc.) with another threshold to determine whether a layer four anomaly is detected with respect to the other layer four traffic metric. In another example, AR server 220 may determine whether a layer four anomaly is detected based on whether port sweeping by user device 110 is detected.

AR server 220 may, for example, compare one or more traffic metrics, associated with layer five traffic metrics, with a respective different threshold that corresponds to each of the one or more layer five traffic metrics. In one example, AR server 220 may compare a quantity of SIP calls to an external server (e.g., a server not associated with service provider network 150) with a threshold associated with a maximum quantity of SIP calls permitted to be made to an external server. AR server 220 may compare other layer five traffic metrics (e.g., a call termination rate, an average call duration, etc.) with another threshold to determine whether a layer five anomaly is detected with respect to the other layer five traffic metrics.

AR server 220 may determine whether an anomaly, associated with network layer six, is detected. AR server 220 may, for example, determine whether a MIME type, which has not been detected at a prior point in time, has been detected by AR server 220.

AR server 220 may, for example, compare one or more traffic metrics, associated with layer seven traffic metrics, with a respective different threshold that corresponds to each of the one or more layer seven traffic metrics. In one example, AR server 220 may compare a quantity of DNS queries to a particular URL over a period of time with a threshold associated with a maximum quantity of DNS queries, to a particular URL, that are permitted over the period of time. AR server 220 may compare another layer seven traffic metric (e.g., a quantity of 404 errors within a time period, etc.) with another threshold to determine whether a layer seven anomaly is detected with respect to the other layer seven traffic metric.

As further shown in FIG. 6, if an anomaly, associated with the traffic, is not detected (block 620—NO), then process 600 may include monitoring traffic being transported to and/or from the service provider network (block 605). For example, AR server 220 may determine that a layer one anomaly does not exist when all of the layer one traffic metrics conform to layer one thresholds. AR server 220 may determine, for example, that a layer one anomaly does not exist, based on a determination that the quantity of bandwidth, associated with the traffic originating from user device 110, is not greater than the threshold associated with a maximum quantity of bandwidth permitted for user device 110.

AR server 220 may determine that a layer three anomaly does not exist when all of the layer three traffic metrics conform to layer three thresholds. For example, AR server 220 may determine that a layer three anomaly does not exist based on a determination that the quantity of DNS queries being processed over the period of time is not greater than the threshold associated with a maximum quantity of bandwidth permitted for user device 110.

AR server 220 may determine that a layer four anomaly does not exist when all of the layer four traffic metrics conform to layer four thresholds. For example, AR server 220 may determine that a layer four anomaly does not exist based on a determination that the quantity of concurrent flows that are destined for the particular port is not greater than the threshold associated with the maximum quantity of concurrent flows permitted to be destined for a port.

AR server 220 may determine that a layer five anomaly does not exist when all of the layer five traffic metrics conform to layer five thresholds. For example, AR server 220 may determine that a layer five anomaly does not exist based on a determination that the quantity of SIP calls to the external server is not greater than the threshold associated with the maximum quantity of SIP calls permitted to be made to an external server.

AR server 220 may determine that a layer six anomaly does not exist when all of the layer six traffic metrics conform to layer six thresholds. For example, AR server 220 may determine that a layer six anomaly does not exist based on a determination that a MIME type associated with the traffic has been detected at a prior point in time.

AR server 220 may determine that a layer seven anomaly does not exist when all of the layer seven traffic metrics conform to layer seven thresholds. For example, AR server 220 may determine that a layer seven anomaly does not exist based on a determination that the quantity of DNS queries to the particular URL is not greater than the threshold associated with the maximum quantity of URL queries permitted to be made to a URL.

AR server 220 may continue to monitor traffic being transported to and/or from service provider network 150 based on the determination that an anomaly has not been detected.

As yet further shown in FIG. 6, if an anomaly, associated with the traffic, is detected (block 620—YES), then process 600 may include obtaining context information associated with an affected user device 110 (block 625). For example, AR server 220 may determine that a layer one anomaly exists when one or more of the layer one traffic metrics do not conform to respective layer one thresholds. AR server 220 may determine, for example, that a layer one anomaly exists, based on a determination that the quantity of bandwidth, associated with the traffic originating from user device 110, is statistically greater (e.g., based on an average bandwidth, a peak bandwidth, etc.) than the threshold associated with a maximum quantity of bandwidth permitted for user device 110.

AR server 220 may determine that a layer three anomaly exists when one or more of the layer three traffic metrics do not conform to respective layer three thresholds. For example, AR server 220 may determine that a layer three anomaly exists based on a determination that the quantity of DNS queries being processed over the period of time is greater than the threshold associated with a maximum quantity of bandwidth permitted for user device 110.

AR server 220 may determine that a layer four anomaly exists when one or more of the layer four traffic metrics do not conform to respective layer four thresholds. For example, AR server 220 may determine that a layer four anomaly exists based on a determination that the quantity of concurrent flows that are destined for the particular port is greater than the threshold associated with the maximum quantity of concurrent flows permitted to be destined for a port.

AR server 220 may determine that a layer five anomaly exists when one or more of the layer five traffic metrics do not conform to respective layer five thresholds. For example, AR server 220 may determine that a layer five anomaly exists based on a determination that the quantity of SIP calls to the external server is greater than the threshold associated with the maximum quantity of SIP calls permitted to be made to an external server.

AR server 220 may determine that a layer six anomaly exists when one or more of the layer six traffic metrics do not conform to respective layer six thresholds. For example, AR server 220 may determine that a layer six anomaly exists based on a determination that a MIME type associated with the traffic has not been detected at a prior point in time.

AR server 220 may determine that a layer seven anomaly exists when one or more of the layer seven traffic metrics do not conform to respective layer seven thresholds. For example, AR server 220 may determine that a layer seven anomaly exists based on a determination that the quantity of DNS queries to the particular URL is greater than the threshold associated with the maximum quantity of URL queries permitted to be made to a URL.

AR server 220 may obtain context information associated with user device 110 affected by the anomaly, based on a determination that an anomaly, associated with the traffic, has been detected. For example, AR server 220 may determine, from the traffic metrics, that user device 110 is affected by the anomaly based on a MDN associated with the flow to which the anomaly corresponds. AR server 220 may obtain context information associated with user device 110 from service provider network 150 and/or CO steering device 230. For example, AR server 220 may send a request to CO steering server 230 for information associated with user device 110. CO steering server 230 may use the MDN and/or an IP address, obtained from the request, to identify an internal IP address and/or port, via which user device 110 communicates with service provider network 150, based on network address translation (NAT) bindings.

In another example, AR server 220 may send a query, to service provider network 150 (e.g., an home subscriber server, an authentication, authorization, and accounting server, etc.), to obtain context information associated with user device 110. The context information, obtained from service provider network 150, may include information associated with an operating system being used by user device 110, a type of user device 110, location information associated with user device 110, information associated with a user of user device 110, etc.

AR server 220 may retrieve context information associated with user device 110, from a memory associated with AR server 220. The context information, retrieved from the memory, may include information associated with a usage history for user device 110, such as information associated with a quantity of prior web pages accessed, previous URLs used, calls received and/or placed, etc.

As still further shown in FIG. 6, process 600 may include sending a request to obtain packets associated with the anomaly (block 630) and receiving the packets associated with the anomaly (block 635). For example, AR server 220 may generate a request to retrieve packets associated with the flows to which the anomaly corresponds. AR server 220 may, for example, generate the request that includes information associated with the flow, such as a destination and/or source IP address associated with the flow, a destination and/or source port associated with the flow, a URL and/or MIME type associated with the flow, information associated with user device 110 (e.g., a MDN, a type of user device, etc.) to which the flow corresponds, and/or a quantity of packets to be obtained. In an example implementation, AR server 220 may store the information associated with the flow in an AR packet to be sent to CO steering device 230 as all or a part of a request for the packets associated with the flow.

CO steering device 230 may receive the request and may replicate packets associated with the flow based on the information associated with the flow obtained from the request. CO steering device 230 may forward the packets to an intended destination based on the destination IP address. CO steering device 230 may send the replicated packets to AR server 220 in response to the request.

As also shown in FIG. 6, process 600 may include performing a packet analysis operation on the packets (block 640). For example, AR server 220 may perform a packet analysis operation on the replicated packets received from CO steering device 230 and/or packets associated with other flows for which an anomaly has been detected. AR server 220 may analyze the packets to classify the anomaly. In one example, AR server 220 may use SPI techniques to analyze the replicated packets, In another example, AR server 220 may use DPI techniques and/or SPI techniques to analyze the replicated packets.

AR server 220 may identify protocol errors within network layer three packet headers (e.g., IPv4 headers, IPv6 headers, etc.) and/or layer four packet headers (e.g., TCP headers, UDP headers, etc.) and may assign a class to the anomaly. In another example, AR server 220 may identify malicious software and/or data (e.g., a virus, a worm, etc.) associated with the packets and may assign another class to the anomaly. In yet another example, AR server 220 may identify a potential electronic attack originating from user device 110 and/or from a particular IP address, URL, port etc. (e.g., based on a quantity of bandwidth associated with the flow, evidence of port sweeping, etc.) and may assign yet another classification to the anomaly. In a further example, AR server 220 may identify signaling errors and/or packet errors (e.g., based on unexpected messages contained within the packets, missing packets, mis-ordered packets, etc.) and may assign a further classification to the anomaly.

AR server 220 may compare information associated with another flow, with which an anomaly is associated, with information associated with the flow obtained from the replicated packets and/or metrics information. For example, AR server 220 may identify whether there is another anomaly occurring within service provider network 150. AR server 220 may compare the classification of the other anomaly with the classification of the anomaly. AR server 220 may determine a quantity of anomalies and/or flows associated with other anomalies within service provider network 150 over a period of time. AR server 220 may determine a location of user devices 110 and/or network devices, within a geographic area and/or network topology, that are affected by the anomaly and/or the other anomaly. AR server 220 may compare the timing information (e.g., a time when the anomaly was detected, a time when the anomaly ended (if any), etc.) associated with the anomaly with timing information associated with the other anomaly within services provider network 150.

As further shown in FIG. 6, process 600 may include sending a notification associated with the anomaly based on the traffic metrics, the context information, and information obtained as a result of the packet analysis (block 645). For example, AR server 220 may generate a notification associated with the anomaly. The notification may include the traffic metrics for one or more of the network layers, that were obtained by AR server 220 as a result of monitoring the traffic being transported to and/or received from service provider network 150. The notification may include context information, associated with user device 110, that was affected by the anomaly. The notification may include information obtained as a result of the packet analysis (e.g., the replicated packets and packets associated with the other anomaly). The notification may include geographical information and/or network topographical information associated with user devices 110 and/or network devices that are affected by the anomaly and/or the other anomaly. The notification may include a time when the anomaly was detected and another time when the anomaly was no longer detected (e.g., if the anomaly is no longer ongoing). The notification may include the classification assigned to the anomaly and/or a unique identifier associated with the anomaly. AR server 220 may send the notification to a network management server that enables the network management server and/or an operator associated with the network management server to remedy the anomaly and/or make changes to service provider network 150 to mitigate the anomaly and/or the other anomaly.

Systems and/or methods, described herein, may enable traffic, associated with a service provider network, to be monitored in order to identify an anomaly, associated with the traffic. The systems and/or methods may monitor the traffic, at one or more network layers (e.g., layers one through seven of the OSI model) of the service provider network. The systems and/or methods may obtain traffic metrics, associated with the one or more network layers, as a result of the traffic monitoring. The systems and/or methods may identify an anomaly, associated with the traffic, based on the traffic metrics. The systems and/or methods may obtain context information associated with a user device that is affected by the anomaly. The systems and/or methods may obtain a copy of the packets associated with the flow to which the anomaly corresponds. The AR server may perform analysis on packets and/or other packets associated with another anomaly. The AR server may send a notification indicating that the anomaly has been detected. The notification may include the traffic metrics, the context information associated with the affected user device, information obtained as a result of the packet analysis and/or the copy of the packets.

The foregoing description provides illustration and description, but is not intended to be exhaustive or to limit the implementations to the precise form disclosed. Modifications and variations are possible in light of the above teachings or may be acquired from practice of the embodiments.

While a series of blocks has been described with regard to FIG. 6, the order of the blocks may be modified in other implementations. Further, non-dependent blocks may be performed in parallel.

It will be apparent that systems and/or methods, as described above, may be implemented in many different forms of software, firmware, and hardware in the implementations illustrated in the figures. The actual software code or specialized control hardware used to implement these systems and methods is not limiting of the embodiments. Thus, the operation and behavior of the systems and methods were described without reference to the specific software code—it being understood that software and control hardware can be designed to implement the systems and methods based on the description herein.

Further, certain portions, described above, may be implemented as a component that performs one or more functions. A component, as used herein, may include hardware, such as a processor, an application-specific integrated circuit (ASIC), or a field-programmable gate array (FPGA), or a combination of hardware and software (e.g., a processor executing software).

It should be emphasized that the terms "comprises"/"comprising" when used in this specification are taken to specify the presence of stated features, integers, steps or components but does not preclude the presence or addition of one or more other features, integers, steps, components or groups thereof.

Even though particular combinations of features are recited in the claims and/or disclosed in the specification, these combinations are not intended to limit the disclosure of the embodiments. In fact, many of these features may be combined in ways not specifically recited in the claims and/or disclosed in the specification. Although each dependent claim listed below may directly depend on only one other claim, the disclosure of the embodiments includes each dependent claim in combination with every other claim in the claim set.

No element, act, or instruction used in the present application should be construed as critical or essential to the embodiments unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

The term "packet" as used herein, may refer to a datagram, a data item, or a cell; a fragment of a packet, a fragment of a datagram, a fragment of a data item, a fragment of a cell; or another type, arrangement, or packaging of data.

What is claimed is:

1. A method comprising:
monitoring, by a first server, a plurality of packets associated with traffic that is traveling to or from a service provider network associated with the first server;
obtaining, by the first server and based on monitoring the plurality of packets, traffic metrics associated with the plurality of packets with respect to one or more network layers;
detecting, by the first server, an anomaly associated with the plurality of packets based on a portion of the traffic metrics associated with at least one network layer of the one or more network layers;
sending, by the first server and to a second server associated with the service provider network, a request for one or more packets, of the plurality of packets, that correspond to the anomaly;
receiving, by the first server and from the second server, copies of the one or more packets after the second server generates the copies of the one or more packets by replicating the one or more packets based on the request, the one or more packets being transmitted to a destination device by the second server;
analyzing, by the first server, each packet, of the copies of the one or more packets, to obtain information associated with the anomaly; and
sending, by the first server, a notification that indicates that the anomaly has been detected,
the notification including at least one of:
the traffic metrics associated with the plurality of packets,
the copies of the one or more packets, or
the information associated with the anomaly.

2. The method of claim 1,
where monitoring the plurality of packets associated with the traffic further includes:
performing a stateful packet inspection operation on each of the plurality of packets in a manner that does not reduce a level of throughput associated with the service provider network, and
where the stateful packet inspection operation includes analyzing a portion of each packet, of the plurality of packets, that does not include a payload portion.

3. The method of claim 1, where the traffic metrics include at least one of:
a network layer one metric that identifies a quantity of bandwidth associated with the traffic,
a network layer three metric that identifies a quantity of user devices that are communicating with a particular uniform resource locator (URL),
a network layer four metric that identifies a quantity of concurrent flows of packets, of the plurality of packets, that are destined for a particular port,
a network layer five metric that identifies a quantity of calls, associated with the service provider network, that are terminated within a period of time,
a network layer six metric that identifies information associated with a type of multipurpose Internet mail extension (MIME) associated with the traffic, or
a network layer seven metric that identifies a quantity of web page errors associated with the traffic.

4. The method of claim 1,
where the traffic metrics include:
a network layer one metric that identifies a quantity of bandwidth associated with the traffic, a network layer three metric that identifies a quantity of user devices that are communicating with a particular uniform resource locator (URL), and a network layer four metric that identifies a quantity of concurrent flows of packets, of the plurality of packets, that are destined for a particular port, and where detecting the anomaly associated with the flow of packets further includes:

detecting a layer one anomaly when the quantity of bandwidth associated with the traffic is greater than a threshold associated with network layer one;

detecting a layer three anomaly when the quantity of user devices, that are communicating with the particular uniform resource locator (URL), is greater than a threshold associated with network layer three; and detecting a layer four anomaly when the quantity of concurrent flows of packets, of the plurality of packets, that are destined for a particular port, is greater than a threshold associated with network layer four.

5. The method of claim 1,
where the traffic metrics include:
a network layer five metric that identifies a quantity of calls, associated with the service provider network, that are terminated within a period of time,
a network layer six metric that identifies information associated with a type of multipurpose Internet mail extension (MIME) associated with the traffic, and
a network layer seven metric that identifies a quantity of web page errors associated with the traffic, and
where detecting the anomaly associated with the flow of packets further includes:
detecting a layer five anomaly when the quantity of calls associated with the service provider network, that are terminated within the period of time, is greater than a threshold associated with network layer five;
detecting a layer six anomaly when the network layer six traffic metric identifies the information associated with the type of multipurpose Internet mail extension (MIME) that has not been previously detected; and
detecting a layer seven anomaly when the quantity of web page errors, associated with the traffic, is greater than a threshold associated with network layer seven.

6. The method of claim 1, where detecting the anomaly associated with the flow of packets further includes:
determining that the portion of the traffic metrics, associated with the at least one network layer, is greater than threshold associated with the at least one network layer.

7. The method of claim 1, further comprising:
obtaining context information associated with a user device that is affected by the anomaly,
the user device being the destination device, and
the context information including at least one of:
a device identifier associated with the user device,
information associated with a type of the user device,
information associated with a location of the user device, or
information associated with an operating system that is executed by the user device; and
sending, to a server device that receives the notification, the context information associated with the user device.

8. The method of claim 1, where the one or more packets are transmitted to the destination device in a manner that does not decrease throughput of the plurality of packets.

9. The method of claim 1,
where analyzing each packet, of the copies of the one or more packets, further includes:

identifying an error in a header of at least one packet of the copies of the one or more packets,
where the header is associated with the at least one network layer, and
where the at least one network layer is one of:
network layer three of the one or more network layers, or
network layer four of the one or more network layers.

10. The method of claim 1, where analyzing each packet, of the copies of the one or more packets, includes:
assigning a first classification to the anomaly based on a determination that the anomaly is a packet error;
assigning a second classification to the anomaly based on a determination that the anomaly is associated with malicious information or software;
assigning a third classification to the anomaly based on a determination that the anomaly is associated with an electronic attack; and
assigning a fourth classification to the anomaly based on a determination that the anomaly is associated with a signaling error.

11. The method of claim 1, further comprising:
identifying another anomaly associated with other traffic;
analyzing packets associated with the other traffic based on the identification of the other anomaly to obtain information associated with the other anomaly;
comparing the information associated with the other anomaly with the information associated with the anomaly; and
sending the information associated with the other anomaly or information obtained as a result of the comparison of the information associated with the other anomaly with the information associated with the anomaly.

12. A computing device associated with a service provider network, the computing device comprising:
one or more processors configured to:
monitor traffic, that is traveling to or from the service provider network, to obtain traffic metrics, associated with the traffic, that corresponds to one or more network layers,
the one or more network layers including at least one of a physical layer, a network layer, a transport layer, a session layer, a presentation layer, or an application layer,
process the traffic metrics with respect to each of the one or more network layers to identify an anomaly, associated with the traffic, that corresponds to at least one network layer of the one or more network layers,
send, to a steering server, a request for packets associated with the traffic based on the anomaly,
receive, from the steering server, copies of the packets associated with the traffic after the steering server generates the copies of the packets by replicating the packets based on the request,
the packets being transmitted to a destination device by the steering server,
analyze the copies of the packets to obtain information associated with the anomaly, and
send, to a server device, a notification that indicates that the anomaly has been identified,
the notification including:
the traffic metrics associated with the traffic, or
the information associated with the anomaly.

13. The computing device of claim 12,
where the request includes information associated with the packets, and
where the information associated with the packets includes at least one of:

a destination Internet protocol (IP) address,
a source IP address,
an identifier associated with a user device from which the flow is sent, or
information associated with a quantity of the packets to be received.

14. The computing device of claim 12, where the one or more network layers are specified by the Open Systems Interconnect (OSI) model.

15. The computing device of claim 12, where the traffic metrics include at least one of:
a traffic metric, associated with the physical layer, that identifies a quantity of concurrent packet flows associated with the traffic,
a traffic metric associated with the network layer, that identifies a quantity of user devices that are communicating with a network associated with a country that is different than another country with which the service provider network is associated,
a traffic metric, associated with the transport layer, that indicates whether a user device is sweeping ports associated with the service provider network,
a traffic metric, associated with the session layer, that identifies an average call duration associated with the traffic,
a traffic metric, associated with the presentation layer, that identifies a multipurpose Internet mail extension (MIME) type associated with the plurality of packets, or
a traffic metric, associated with the application layer, that identifies a quantity of domain name queries associated with a particular URL.

16. The computing device of claim 15,
where, when processing the traffic metrics with respect to the each of the one or more network layers, the one or more processors are configured to:
identify a physical layer anomaly when the quantity of concurrent packet flows, associated with the traffic, is greater than a threshold associated with the physical layer,
identify a network layer anomaly when the quantity of user devices that are communicating with the network associated with the country that is different than the other country, is greater than a threshold associated with the network layer, and
identify a transport layer anomaly when the traffic metric associated with the transport layer indicates that the user device is sweeping the ports, and
where the anomaly is one of the physical layer anomaly, the network layer anomaly, or the transport layer anomaly.

17. The computing device of claim 15,
where, when processing the traffic metrics with respect to the each of the one or more network layers, the one or more processors are configured to:
identify a session layer anomaly when a difference between the average call duration associated with the traffic and an average call duration, associated with the service provider network, is greater than a threshold associated with the session layer,
identify a presentation layer anomaly when the traffic metric associated with the presentation layer identifies a type of multipurpose Internet mail extension (MIME) that has not been previously detected, and
identify an application layer anomaly when the quantity of domain name queries, associated with a particular URL, is greater than a threshold associated with the application layer, and
where the anomaly is one of the session layer anomaly, the presentation layer anomaly, or the application layer anomaly.

18. The computing device of claim 12, where the one or more processors are further configured to:
retrieve context information associated with a user device that is affected by the anomaly,
the user device being the destination device, and
the context information including at least one of:
a device identifier associated with the user device,
information associated with a previous quantity of web pages that were accessed by the user device, or
information associated with one or more other user devices to which a prior quantity of calls were placed by the user device, and
send, to the server device, the context information associated with the user device.

19. The computing device of claim 12, where, when analyzing the copies of the packets, the one or more processors are configured to:
assign a classification to the anomaly based on the traffic metrics and the information associated with the anomaly,
obtain information associated with one or more other anomalies that have been detected within the service provider network, and
send, to the server device, information associated with the classification assigned to the anomaly and information associated with another anomaly, of the one or more other anomalies, that has been assigned a classification that matches the classification assigned to the anomaly.

20. A server device, associated with a service provider network, comprising:
a memory; and
a processor configured to:
monitor traffic received from or destined for a user device associated with the service provider network,
obtain, from the traffic and based on monitoring the traffic, information associated with the traffic that corresponds to one or more network layers associated with the service provider network,
determine that an anomaly is associated with the traffic based on the information associated with the traffic and one or more thresholds that corresponds to the one or more network layers,
generate a request to retrieve packets associated with the traffic based on determining that the anomaly is associated with the traffic,
send the request to a server associated with the service provider network,
receive, from the server, copies of the packets after the server generates the copies of the packets by replicating the packets based on the request,
the packets being transmitted to a destination device by the server,
analyze the copies of the packets to obtain information associated with the anomaly,
send, to a network management server associated with the service provider network, a notification that indicates that the anomaly has been detected,
the notification including at least one of:
the information associated with the traffic, or
the information associated with the anomaly.

21. The server device of claim 20,
where the processor is further configured to:
- provide, for display, information identifying a geographical area within which the service provider network is located, and
- provide, for display, information associated with a respective location of each user device that is affected by the anomaly, where the information associated with the respective location is based on:
- the information associated with the traffic, or
- the information associated with the anomaly.

22. The server device of claim 20, where, when analyzing the copies of the packets to obtain the information associated with the anomaly, the processor is configured to:
- identify errors in packet headers associated with an Internet protocol (IP) version four (IPv4) or IP version six (IPv6), and
- send, to the network management server, information associated with the errors in the packet headers.

23. The server device of claim 20, where, when analyzing the copies of the packets to obtain the information associated with the anomaly, the processor is configured to:
- identify errors in packet headers associated with a transport control protocol (TCP) or a user datagram protocol (UDP), and
- send, to the network management server, information associated with the errors in the packet headers.

24. The server device of claim 20, where, when analyzing the copies of the packets to obtain the information associated with the anomaly, the processor is configured to:
- assign a classification to the anomaly based on the information associated with the traffic or the information associated with the anomaly,
- identify another anomaly, of the one or more anomalies, that has been assigned the classification, and
- send, to the network management server, the information associated with the anomaly and information associated with the other anomaly.

25. The server device of claim 20, where the information associated with the traffic includes:
- a network layer five metric that identifies a quantity of calls, associated with the service provider network, that are terminated within a period of time,
- a network layer six metric that identifies information associated with a type of multipurpose Internet mail extension (MIME) associated with the traffic, or
- a network layer seven metric that identifies a quantity of web page errors associated with the traffic.

\* \* \* \* \*